US009148059B2

(12) United States Patent
Park

(10) Patent No.: US 9,148,059 B2
(45) Date of Patent: Sep. 29, 2015

(54) DEVICE FOR JUDGING IMBALANCE CURRENT OF DC-DC CONVERTER AND METHOD THEREOF

(75) Inventor: HyongJoon Park, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 949 days.

(21) Appl. No.: 13/324,452

(22) Filed: Dec. 13, 2011

(65) Prior Publication Data

US 2013/0054167 A1 Feb. 28, 2013

(30) Foreign Application Priority Data

Aug. 30, 2011 (KR) .................. 10-2011-0087312

(51) Int. Cl.
*H02M 3/28* (2006.01)
*H02M 1/40* (2007.01)

(52) U.S. Cl.
CPC .. *H02M 3/28* (2013.01); *H02M 1/40* (2013.01)

(58) Field of Classification Search
CPC ........... H02M 1/34; H02M 1/40; H02M 3/22; H02M 3/28; H02M 3/156; H02M 3/158; H02M 3/337; H02M 3/1584; H02M 7/17; H02M 7/23; G01R 19/165; G01R 27/08; G01R 31/40

See application file for complete search history.

(56) References Cited

U.S. PATENT DOCUMENTS 7,835,165 B2 * 11/2010 Hatanaka .................. 363/69
2010/0315047 A1 * 12/2010 Ni et al. .................. 323/234

FOREIGN PATENT DOCUMENTS

JP 2010/239770 A 10/2010
KR 10-0177873 11/1998
WO 2007/135730 A1 11/2007

* cited by examiner

*Primary Examiner* — Manuel L Barbee
(74) *Attorney, Agent, or Firm* — Mintz Levin Cohn Ferris Glovsky and Popeo, P.C.; Peter F. Corless

(57) ABSTRACT

A device that determines a second side current imbalance of a DC-DC converter, wherein the second side is a center tap which includes a voltage measuring portion that measures a voltage drop of each connecting portion of the DC-DC converter, an average resistance calculating portion that calculates average resistance from the measured voltage drops, a saturation reference value calculating portion, and a saturation determination portion that compares the saturation reference value and the average resistance. By measuring the voltage drop of each contact portion after supplying a low voltage DC power to an output side, a determination can be made as to whether a product is saturated.

5 Claims, 9 Drawing Sheets

DEVICE FOR JUDGING IMBALANCE CURRENT OF DC-DC CONVERTER AND METHOD THEREOF

CROSS-REFERENCE TO RELATED APPLICATION

This application claims priority to and the benefit of Korean Patent Application No. 10-2011-0087312 filed in the Korean Intellectual Property Office on Aug. 30, 2011, the entire contents of which are incorporated herein by reference.

BACKGROUND OF THE INVENTION (a) Field of the Invention

The present invention relates to a device and method for determining current imbalance of a DC-DC converter. More particularly, the present invention relates to a device and method for determining current imbalance a DC-DC converter by measuring a voltage drop of each connecting portion to simply detect a saturation condition after supplying DC power to an output side without operating the DC-DC converter.

(b) Description of the Related Art

Generally, a DC-DC converter boosts or drops a DC voltage for subsequent use in a variety of areas. The DC-DC converter includes a power module that transforms an input DC voltage to AC voltage in a first side of a transformer, and a rectifying portion that rectifies the transformed AC voltage to a DC voltage in a second side of the transformer.

The power module includes two pairs of transistors as switching elements, wherein DC voltage is transformed to a periodic AC signal according to an operating order of the transistors.

FIG. 6 shows a circuit of a conventional insulation type of full-bridge converter in which a first side is a full bridge and a second is a center tap, and which is suitable for a DC-DC converter for a vehicle that requires high capacity, small size, and lightness in weight.

However, the biggest drawback of such a full-bridge type of converter is saturation of a transformer core. In particular, when the transformer becomes saturated, it looses its magnetic characteristic which can damage the converter.

There may be two potential causes of the transformer saturation. A first case occurs when an average voltage of a transformer input voltage is not 0, and a second case occurs when a second side impedance of a transformer does not coincide.

FIG. 7 shows a B-H curve of a transformer core, wherein (a) of FIG. 7 shows that the transformer core does not exceed a saturation area and is operated within a normal range, and (b) and (c) of FIG. 7 show that a transformer is saturated outside of the normal range because an operating area of the transformer is biased toward one side.

FIG. 8 further shows a transformer first side current ($I_p$) waveform in a normal case. As shown in FIG. 8, the current waveform has an up/down symmetrical structure such that it is not biased toward one side. Conversely, FIG. 9 shows a current waveform of a transformer in a case in which saturation occurs and the current leans upward, which is demonstrated by the sharp rise in the current waveform. This denotes that the transformer is saturated and does not function as a magnetic member in this area.

However, this method for determining the imbalance of the converter through use of the waveform as described above is not objective, and therefore it is not a suitable or reliable method for determining whether the converter is operating in a normal range or whether there is saturation.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method having advantages of checking whether a product is saturated by simply measuring only a voltage drop of each contact portion after a low voltage DC power is supplied to an output side of an insulation type of DC-DC converter without operating the converter. The converter further has a second side with a center tap structure which can resolve a current imbalance problem of a transformer that can be generated by an assembly fault of the second side.

According to an exemplary embodiment of the present invention, a current imbalance determination device of a second side of the DC-DC converter that determines a second side current imbalance of the DC-DC converter of which the second side thereof is a center tap may include a voltage measuring portion that measures a voltage drop of each connecting portion by supplying DC power to an output side of the DC-DC converter, an average resistance ($\Delta R'$) calculating portion that calculates an average resistance from the voltage that is measured by the voltage measuring portion, a saturation reference value calculating portion that determines a saturation reference value, and a saturation determination portion that compares the saturation reference value and the average resistance to determine a saturation condition of a second side current of the converter.

The saturation determination portion may determine that a product is normal, if the average resistance ($\Delta R'$) is less than a saturation reference value ($\alpha$), and the saturation determination portion may determine that a product is defective to generate a current imbalance, if the average resistance ($\Delta R'$) is larger than the saturation reference value ($\alpha$).

The average resistance may be calculated by a reduced resistance of which a voltage of each connecting portion is divided by a second side wire voltage of a transformer.

A current imbalance determination method of a second side of a DC-DC converter that determines a second side current imbalance of the DC-DC converter of which the second side thereof is a center tap according to an exemplary embodiment of the present invention may include measuring a voltage drop of each connecting portion by supplying DC power to an output side of the DC-DC converter, calculating average resistance ($\Delta R'$) through the voltage measured in the connecting portion, determining a saturation reference value ($\alpha$), comparing the saturation reference value with the average resistance, and determining that a product is normal if the saturation reference value is larger than a standard resistance, and determining that a product is detective if the saturation reference value is less than a standard resistance.

An exemplary embodiment of the present invention can check whether a product is saturated or not by measuring a voltage drop of each contact portion after supplying a low voltage DC power to an output side without operating the converter.

DETAILED DESCRIPTION OF THE EMBODIMENTS

An exemplary embodiment of the present invention will hereinafter be described in detail with reference to the accompanying drawings, so that a person having ordinary skill in the art pertinent to the present invention may easily carry out the present invention.

As those skilled in the art would realize, the described embodiments may be modified in various different ways, all without departing from the spirit or scope of the present invention.

Figure 1:
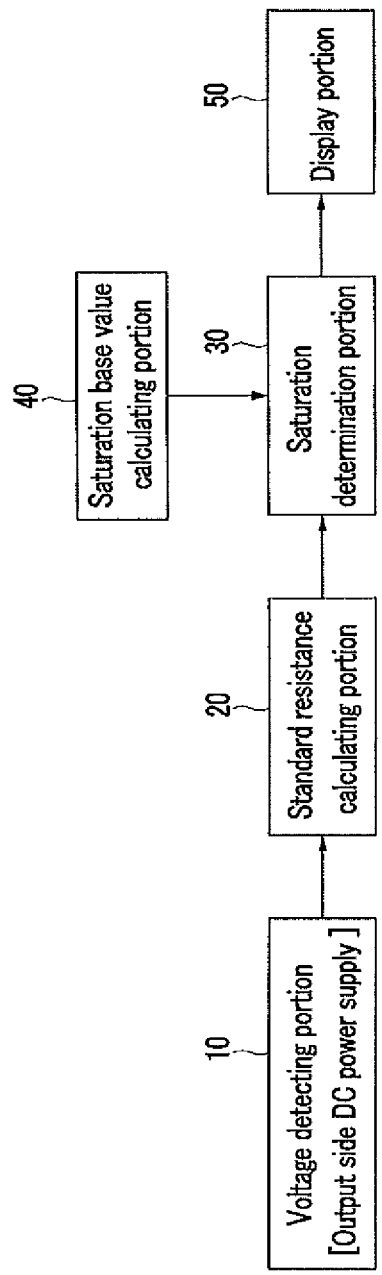
FIG. 1 is a schematic diagram of a current imbalance determination device of a DC-DC converter according to an exemplary embodiment of the present invention.

FIG. 1 is a schematic diagram of a current imbalance determination device of a DC-DC converter according to an exemplary embodiment of the present invention. As shown in FIG. 1, the current imbalance determination device includes a voltage measuring portion 10 that supplies DC power to an output side and measures the voltage, an average resistance calculating portion 20 that uses the measured voltage to calculate average resistance, a saturation reference value calculating portion 40 that calculates a saturation reference value which is a base value for determining a saturation condition, a saturation determination portion 30 that compares the saturation reference value and the average resistance to determine a saturation condition, and a display portion 50 that displays this condition.

Figure 3:
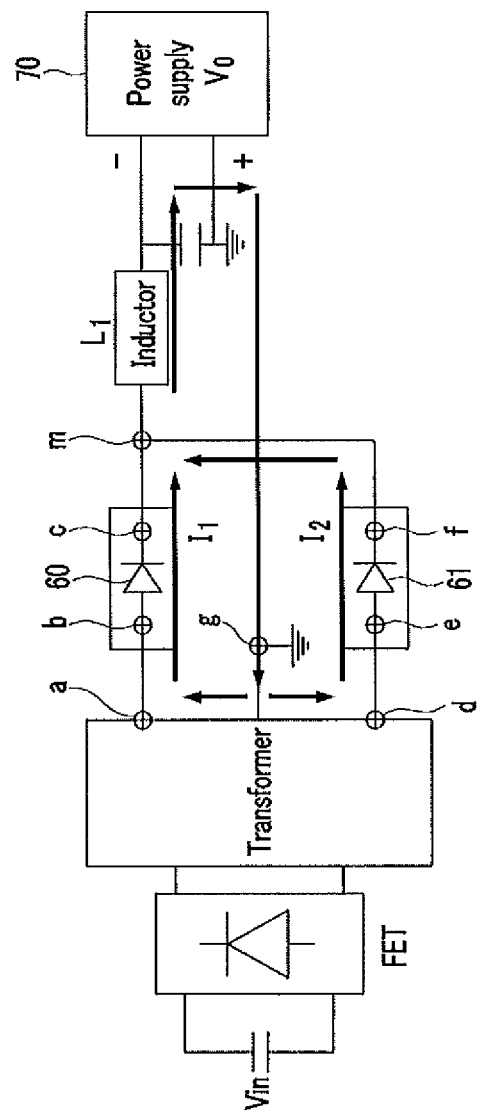
FIG. 3 is a drawing showing a voltage measurement point according to an exemplary embodiment of the present invention.

As shown in FIG. 3, in the voltage measuring portion 10, if a power supply 70 that supplies low voltage DC power is connected to an output side of the DC-DC converter, a pair of diodes 60 and 61 function as a rectifier that open in a forward direction such that current flows.

Figure 5:
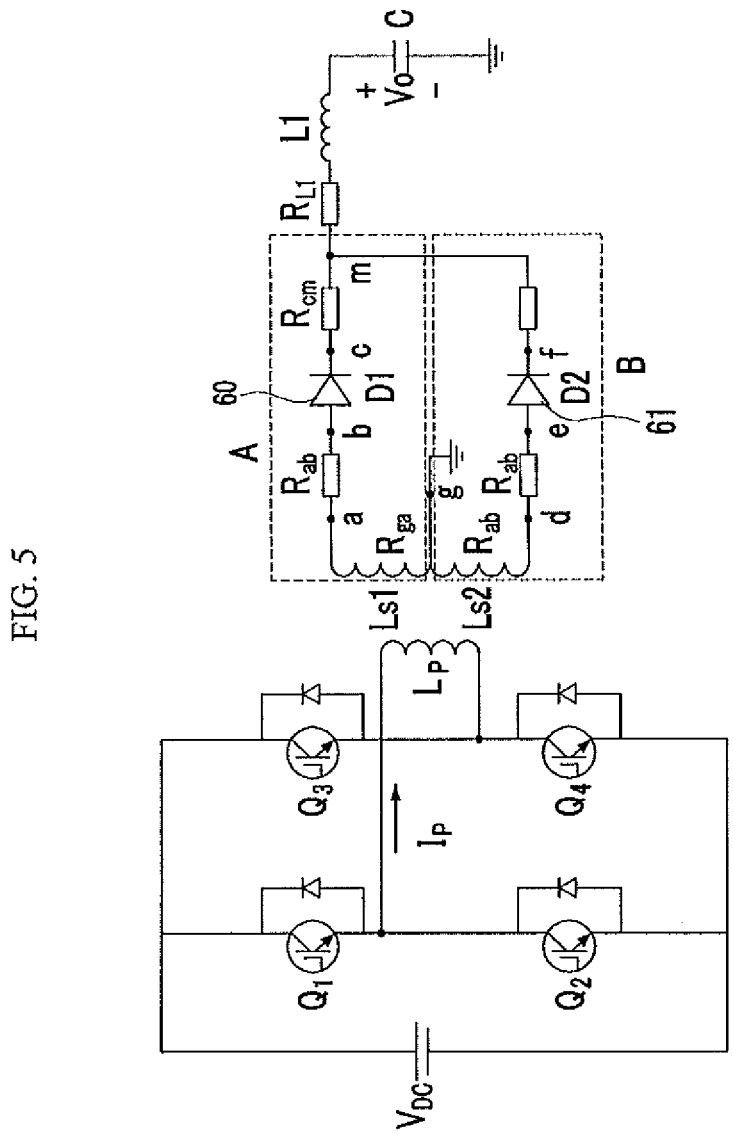
FIG. 5 is a circuit diagram including impedance according to an assemblage of a diode according to an exemplary embodiment of the present invention.
Figure 6:
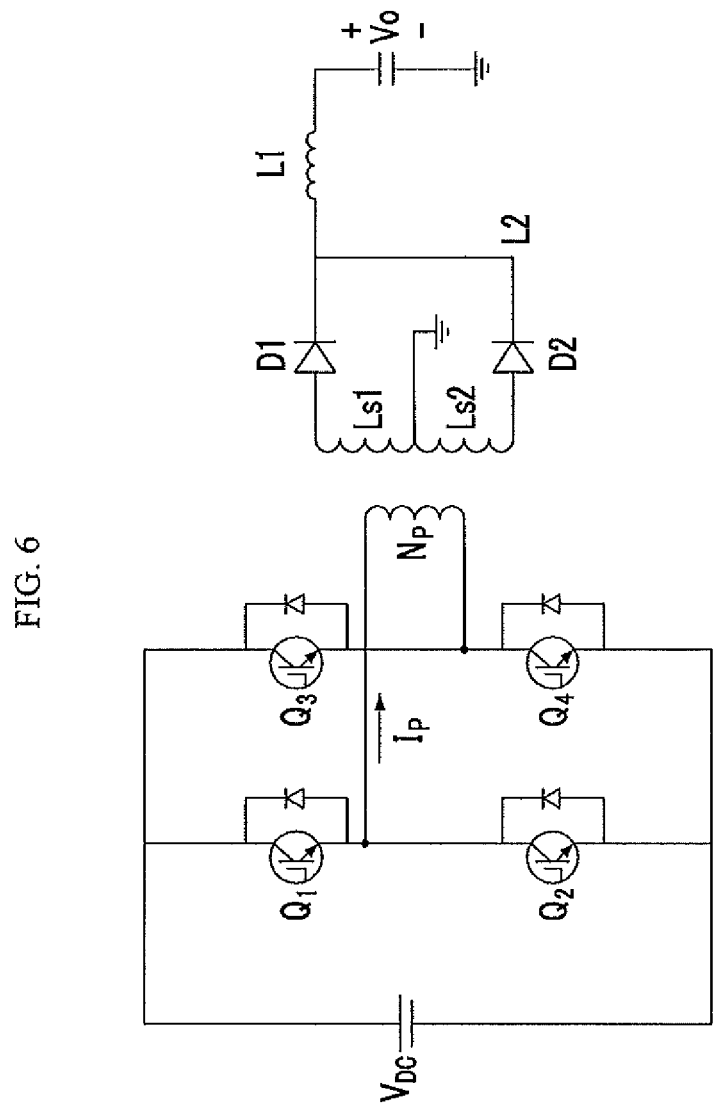
FIG. 6 is a circuit diagram of a DC-DC converter of which a second side thereof is a center tap.
Figure 7:
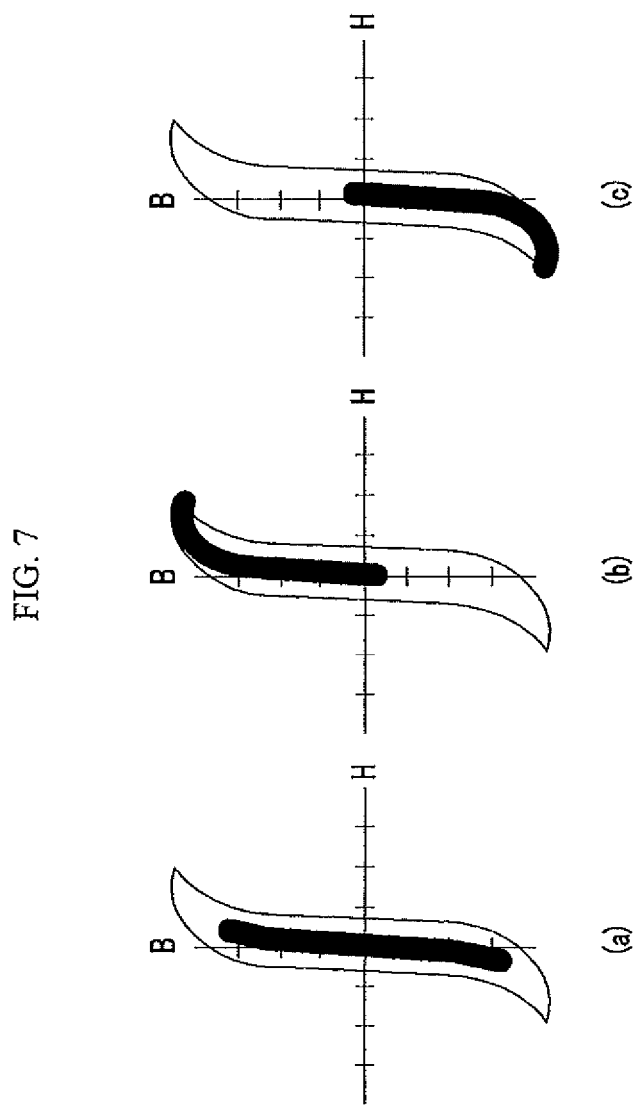
FIG. 7 shows a B-H curve of a transformer core in a DC-DC converter.
Figure 8:
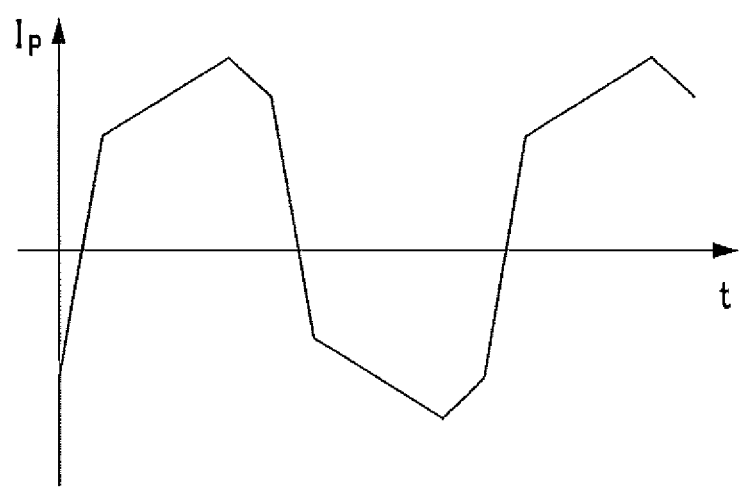
FIG. 8 shows a first side current waveform of a transformer in a normal DC-DC converter.
Figure 9:
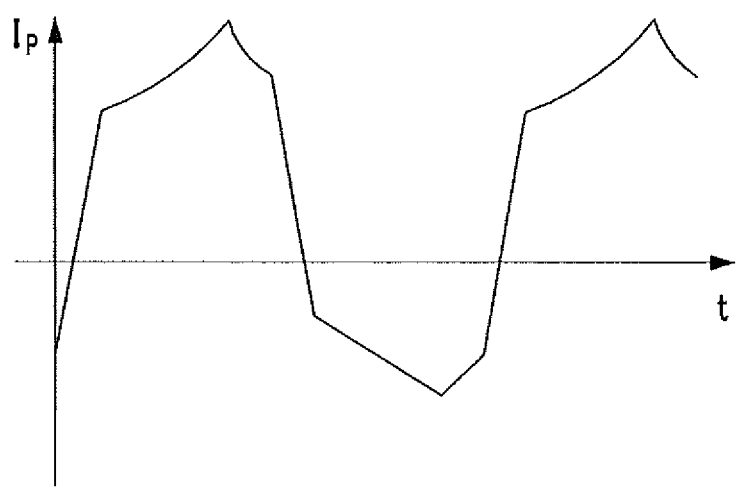
FIG. 9 shows a first side current waveform of a transformer in a DC-DC converter in a saturation condition.

As shown in FIG. 5, if DC power is conversely supplied to an output side, two closed circuits (A, B) are formed in a second side. In this case, when a voltage drop of each connecting portion is measured, the amount of voltage drop that is generated varies according to the resistance of each part and the currents $I_1$ and $I_2$ flowing at both sides.

In FIG. 5 of this case, $R_{ab}$ is an assembly resistance between the Ls1 transformer and the positive (+) electrode of the first diode 60, $R_{cm}$ is an assembly resistance between the negative (−) electrode of the first diode 60 and a connecting portion m, $R_{ga}$ is a resistance of a transformer second side Ls1 wire, $R_{de}$ is an assembly resistance between an Ls2 transformer and a positive (+) electrode of the second diode 61, $R_{fm}$ is an assembly resistance between the negative (−) electrode of the second diode 61 and a connecting portion m, and $R_{gd}$ is a resistance of a transformer second side Ls2 wire.

In this case, the resistances of the closed circuits (A, B) are respectively $R_A = R_{ab} + R_{cm} + R_{ga}$ and $R_B = R_{de} + R_{fm} + R_{gd}$.

Figure 4:
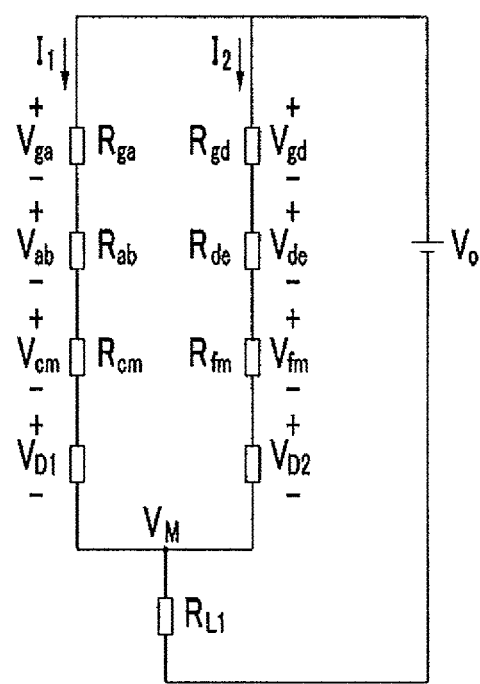
FIG. 4 is an equivalent circuit diagram in a case that DC power is connected to a DC-DC converter according to an exemplary embodiment of the present invention.

Each connecting portion (a-f, m) for measuring voltage drop is drawn in an equivalent circuit shown in FIG. 4.

Voltages in each portion of FIG. 4 can be arranged as follows.

$$V_{ga} = I_1 R_{ga} \quad V_{gd} = I_2 R_{gd}$$

$$V_{ab} = I_1 R_{ab} \quad V_{de} = I_2 R_{de}$$

$$V_{cm} = I_1 R_{cm} \quad V_{fm} = I_2 R_{fm}$$

The average resistance calculating portion 20 calculates voltage of each connecting portion that is measured in the voltage measuring portion 10 to calculate a standard resistance. However, the resistance calculation using voltage of each connecting portion is complex because the current values of $I_1$ and $I_2$ are varied according to the variation in resistance. It is, thus, necessary to erase the current section so as to resolve this, and $R_{ga}$ and $R_{gd}$ resistance values, which are wire resistances of a transformer, can be maintained at uniform values by managing a product specification. Accordingly, the current section is eliminated by dividing the voltage value of each connecting portion with the voltage value of a transformer second side wire to calculate a reduced resistance.

The reduced resistance is a value of which voltage in each connecting portion is divided by voltage of a second side wire.

That is, the reduced resistance of which the current section is eliminated can be calculated as follows.

$$V_{ga} = I_1 R_{ga} \quad V_{gd} = I_2 R_{gd}$$
$$V_{ab} = I_1 R_{ab} \quad V_{de} = I_2 R_{de} \longrightarrow$$
$$V_{cm} = I_1 R_{cm} \quad V_{fm} = I_2 R_{fm}$$

$$R'_{ga} = V_{ga} / V_{ga} = I_1 R_{ga} / I_1 R_{ga} = R_{ga} / R_{ga}$$
$$R'_{ab} = V_{ab} / V_{ga} = I_1 R_{ab} / I_1 R_{ga} = R_{ab} / R_{ga}$$
$$R'_{cm} = V_{cm} / V_{ga} = I_1 R_{cm} / I_1 R_{ga} = R_{cm} / R_{ga}$$

$$R'_{gd} = V_{gd} / V_{gd} = I_2 R_{gd} / I_2 R_{gd} = R_{gd} / R_{gd}$$
$$R'_{de} = V_{de} / V_{gd} = I_2 R_{de} / I_2 R_{gd} = R_{de} / R_{gd}$$
$$R'_{fm} = V_{fm} / V_{gd} = I_2 R_{fm} / I_2 R_{gd} = R_{fm} / R_{gd}$$

The saturation reference value calculating portion 40 uses the reduced resistance that is calculated in the average resistance calculating portion 20 to find the sum of each inductor resistance, and then calculates a difference of the entire reduced resistance of each inductor to output the result thereof as follows.

$$\Sigma R'_{left} = R_{ga}' + R_{ab}' + R_{cm}' = 1 + R_{ab}/R_{ga} + R_{cm}/R_{ga}$$

$$\Sigma R'_{right} = R_{gd}' + R_{de}' + R_{fm}' = 1 + R_{de}/R_{gd} + R_{fm}/R_{gd}$$

$$\Sigma R'_{left} - \Sigma R'_{right} = (R_{ab}/R_{ga} + R_{cm}/R_{ga}) - (R_{de}/R_{gd} + R_{fm}/R_{gd})$$

In the equation, $\Sigma R_{left}$ is a sum of the reduced resistance in the closed circuit A, and $\Sigma R_{right}$ is a sum of the reduced resistance in the closed circuit B.

If it is assumed that the resistance of a transformer second side wire is equal through product specification management, the equation would be arranged as follows, and accordingly, the standard resistance ($\Delta R'$) is calculated.

That is, $R_{ga}=R_{gd}$, and the standard resistance is calculated by the equation below.

$$\Delta R' = \Sigma R'_{left} - \Sigma R'_{right} = ((R_{ab}+R_{cm})-(R_{de}+R_{fin}))/R_{ga}$$

In this case, a saturation reference value is calculated through the equation below.

$$B_{max}=B_{dc}+\Delta B/2$$

where $$B_{dc} = 4\pi 10^{-7} \frac{N_s}{l_e} I_{s,avg},$$

$$\Delta B = \frac{V_{in}\Delta t}{N_p A_e},$$

$N_p$ is a first side turning number, $N_s$ is a second side turning number, $l_e$ is a valid length of magnetic flux, $A_e$ is a valid cross-section of a transformer, $B_{max}$ is a maximum magnetic flux density of a transformer, $V_{in}$ is an input voltage, $I_{s,avg}$ is a second side average current of a transformer, and $B_{dc}$ is a DC component of a transformer magnetic density.

In this case, the average value and the standard resistance of the transformer second side are proportional, and the proportional coefficient thereof is experimentally calculated.

That is, $I_{s,avg}=k\Delta R'$.

Also, the saturation reference value ($\alpha$) is expressed as follows.

$$\alpha \approx \left(B_{max} - \frac{V_{in}\Delta t}{N_p A_e}\right)\left(\frac{l_e}{4\pi 10^{-7} N_s k}\right)$$

The saturation determination portion 30 compares the calculated standard resistance ($\Delta R'$) with the saturation reference value ($\alpha$), and if the standard resistance is less than the saturation reference value, it is determined that the manufactured DC-DC converter is normally assembled to not generate a current imbalance according to the resistance fault.

However, if the standard resistance is larger than the saturation reference value, it is determined that the manufactured DC-DC converter is faulty and generates a current imbalance according to the resistance fault.

Thereafter, the determined result is displayed through the display portion 50 such that one can easily judge whether the manufactured product is normal or defective.

Figure 2:
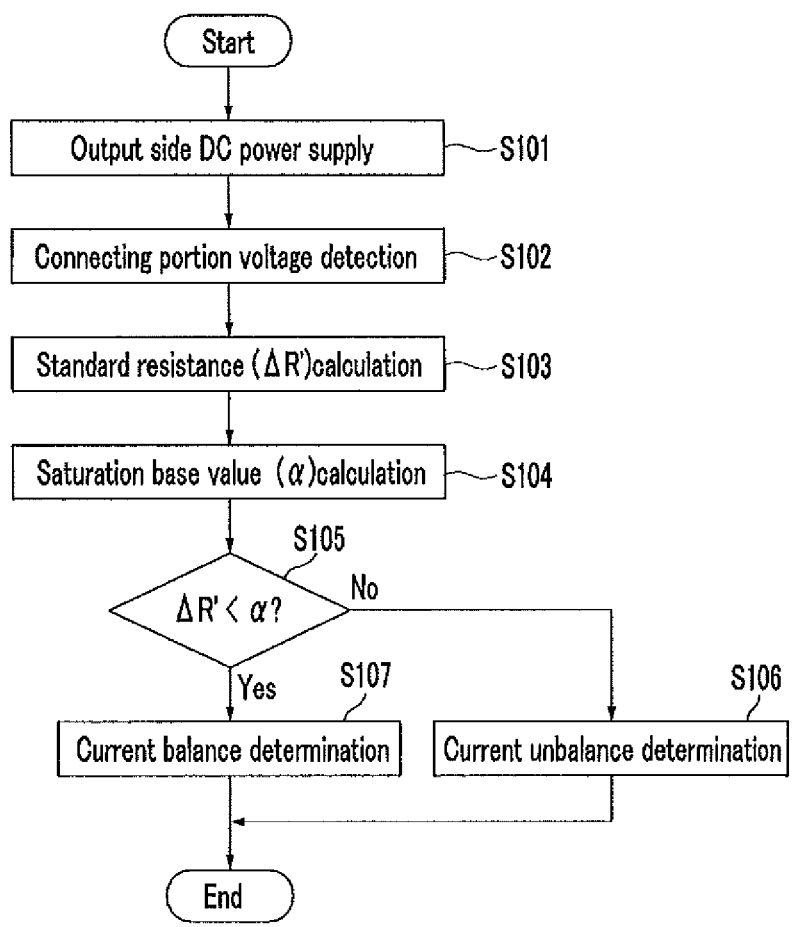
FIG. 2 is a flowchart of a current imbalance determination procedure of a DC-DC converter according to an exemplary embodiment of the present invention.

Hereinafter, referring to FIG. 2, a method for determining a current imbalance of a second side of a DC-DC converter according to an exemplary embodiment of the present invention will be described.

First, DC power is supplied to an output side of a second side of a DC-DC converter, voltage is measured in each connecting portion in S102, the measured voltage is used to calculate a standard resistance) ($\Delta R'$) in S103, and a reduced resistance is calculated before calculating the standard resistance ($\Delta R'$).

According to this method, the resistance of each portion can be measured without affecting the current of each portion. After the standard resistance is calculated, the sums ($\Sigma R_{left}$, $\Sigma R_{right}$) of the reduced resistance in the closed circuit (A, B) are calculated respectively, and the difference thereof is used to calculate the standard resistance ($\Delta R'$).

Separately, the saturation reference value ($\alpha$) is calculated in S104, and the standard resistance ($\Delta R'$) and the saturation reference value ($\alpha$) are compared with each other in S105. If the standard resistance ($\Delta R'$) in S105 is less than the saturation reference value in S107, then a product is determined to be normal. If the standard resistance is larger than the saturation reference value in S106, then the current of a product is determined to be unbalanced.

As described above, a determination of whether the current of a second side is unbalanced or not can be made by simply supplying an output side with DC power without operating the DC-DC converter.

Furthermore, the above described processes and methods may be performed by control logic embodied as computer readable media on a computer readable medium containing executable program instructions executed by a processor, controller or the like. Examples of the computer readable mediums include, but are not limited to, ROM, RAM, compact disc (CM-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

10: voltage measuring portion
20: average resistance calculating portion
30: saturation determination portion
40: saturation reference value calculating portion
50: display portion
60: first diode
61: second diode
70: power supply

What is claimed is:

1. A current imbalance determination device of a second side of a DC-DC converter that determines a second side current imbalance of the DC-DC converter, wherein the second side is a center tap, comprising:
   a voltage measuring portion that measures a voltage drop of each connecting portion of the DC-DC converter by supplying DC power to an output side of the DC-DC converter;
   an average resistance ($\Delta R'$) calculating portion that calculates an average resistance from the measured voltage drop of each connecting portion;
   a saturation reference value calculating portion that determines a saturation reference value; and
   a saturation determination portion that compares the saturation reference value and the average resistance to determine a saturation condition of the second side current of the DC-DC converter.

2. The current imbalance determination device of claim 1, wherein the saturation determination portion determines that a product is normal if the average resistance ($\Delta R'$) is less than a saturation reference value ($\alpha$), and the saturation determination portion determines that a product is defective and generates a current imbalance if the average resistance ($\Delta R'$) is larger than the saturation reference value ($\alpha$).

3. The current imbalance determination device of claim 1, wherein the average resistance is calculated by a reduced resistance in which a voltage of each connecting portion is divided by a second side wire voltage of a transformer.

4. A current imbalance determination method of a second side of a DC-DC converter that determines a second side current imbalance of the DC-DC converter, wherein the second side is a center tap, comprising:
- measuring a voltage drop of each connecting portion of the DC-DC converter by supplying DC power to an output side of the DC-DC converter;
- calculating average resistance ($\Delta R'$) from the measured voltage drop of each connecting portion;
- determining a saturation reference value ($\alpha$);
- comparing the saturation reference value with the average resistance; and
- determining that a product is normal if the saturation reference value is larger than a standard resistance, and determining that a product is detective if the saturation reference value is less than a standard resistance.

5. A non-transitory computer readable medium containing program instructions executed by a controller, the computer readable medium comprising:
- program instructions that measuring a voltage drop of each connecting portion of a DC-DC converter;
- program instructions that calculate an average resistance ($\Delta R'$) from the measured voltage drop of each connecting portion;
- program instructions that determine a saturation reference value ($\alpha$);
- program instructions that compare the saturation reference value with the average resistance; and
- program instructions that determine that a product is normal if the saturation reference value is larger than a standard resistance, and determining that a product is detective if the saturation reference value is less than a standard resistance.

* * * * *